H. R. HAGGETT.
SKIVING MACHINE.
APPLICATION FILED JUNE 21, 1920.
1,430,077.
Patented Sept. 26, 1922.
6 SHEETS—SHEET 4.
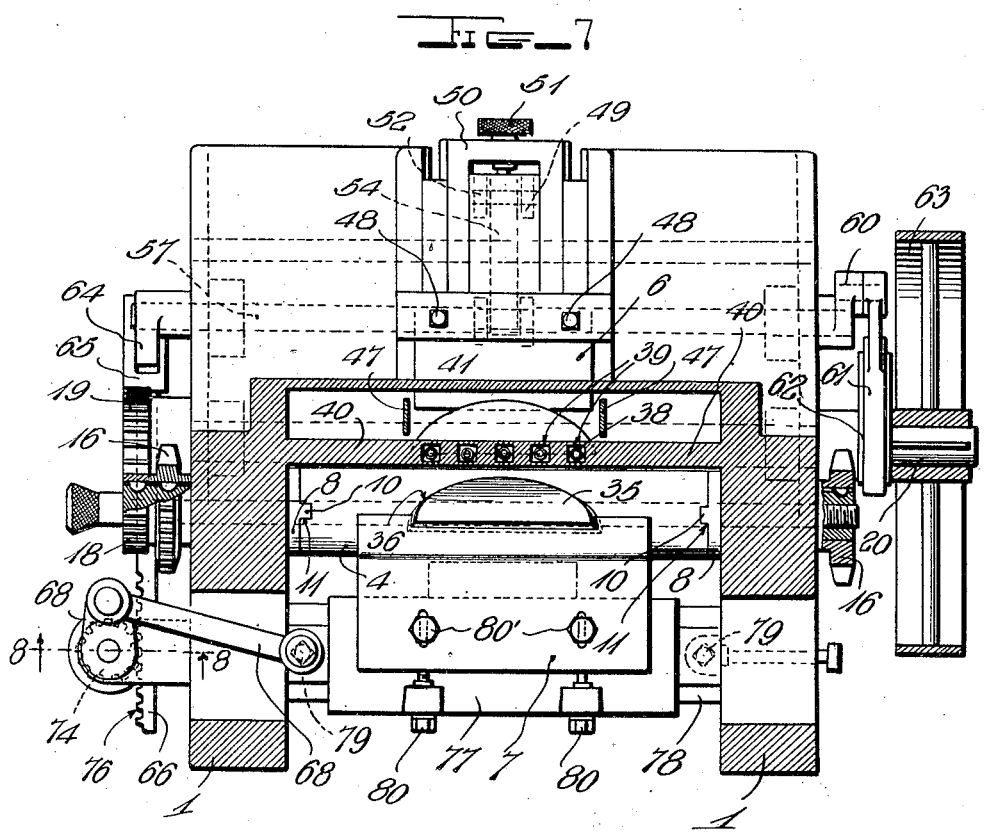

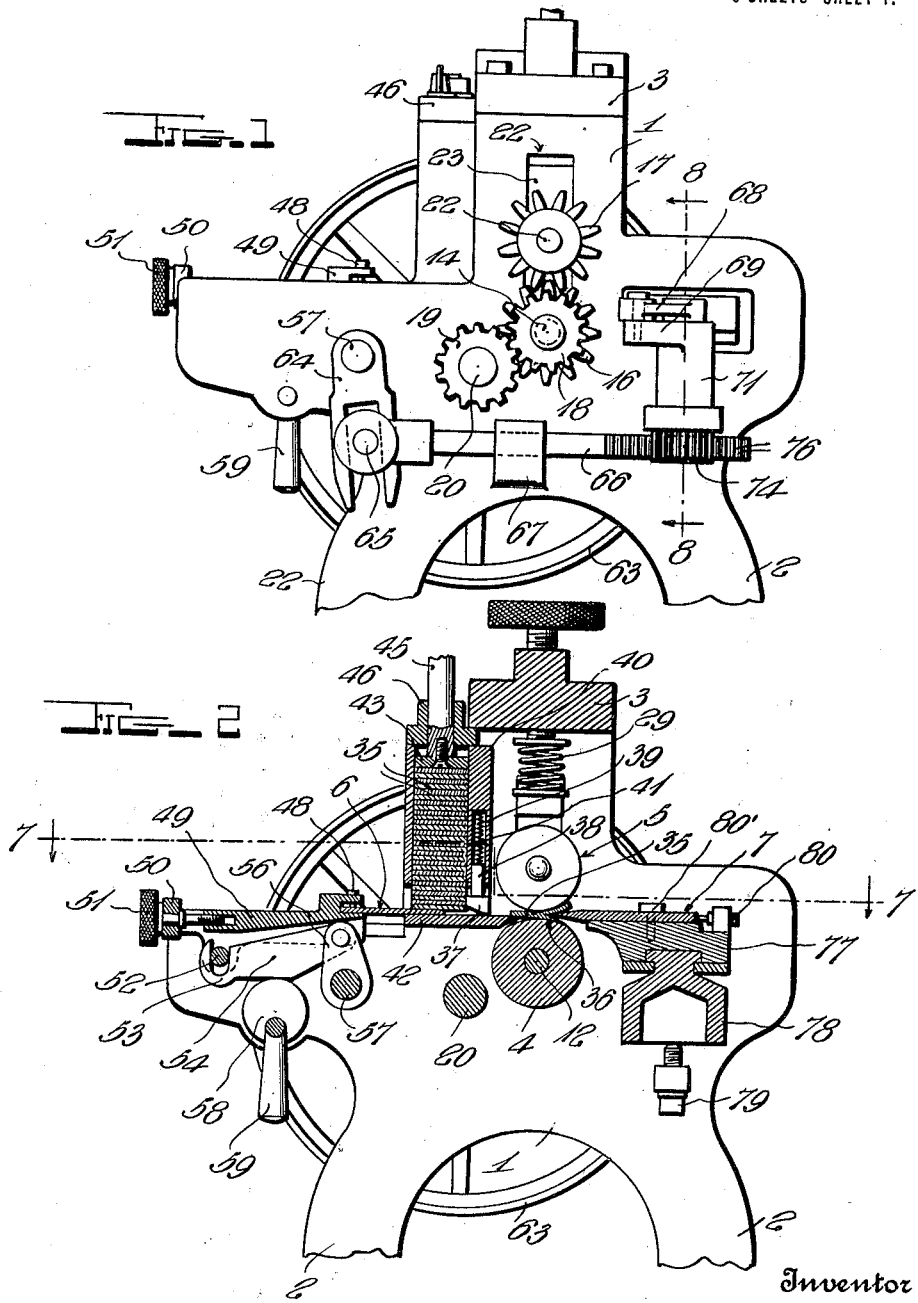

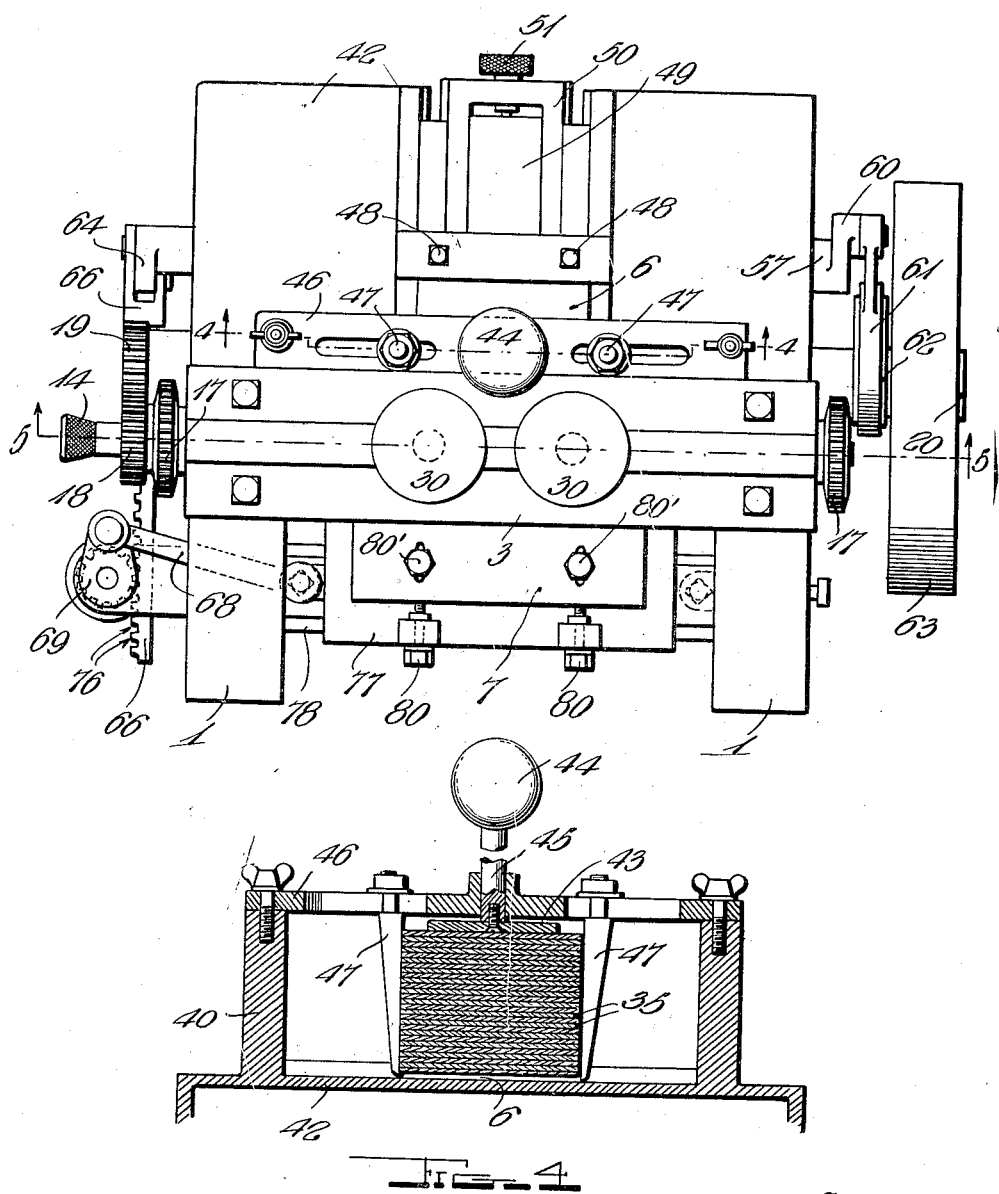

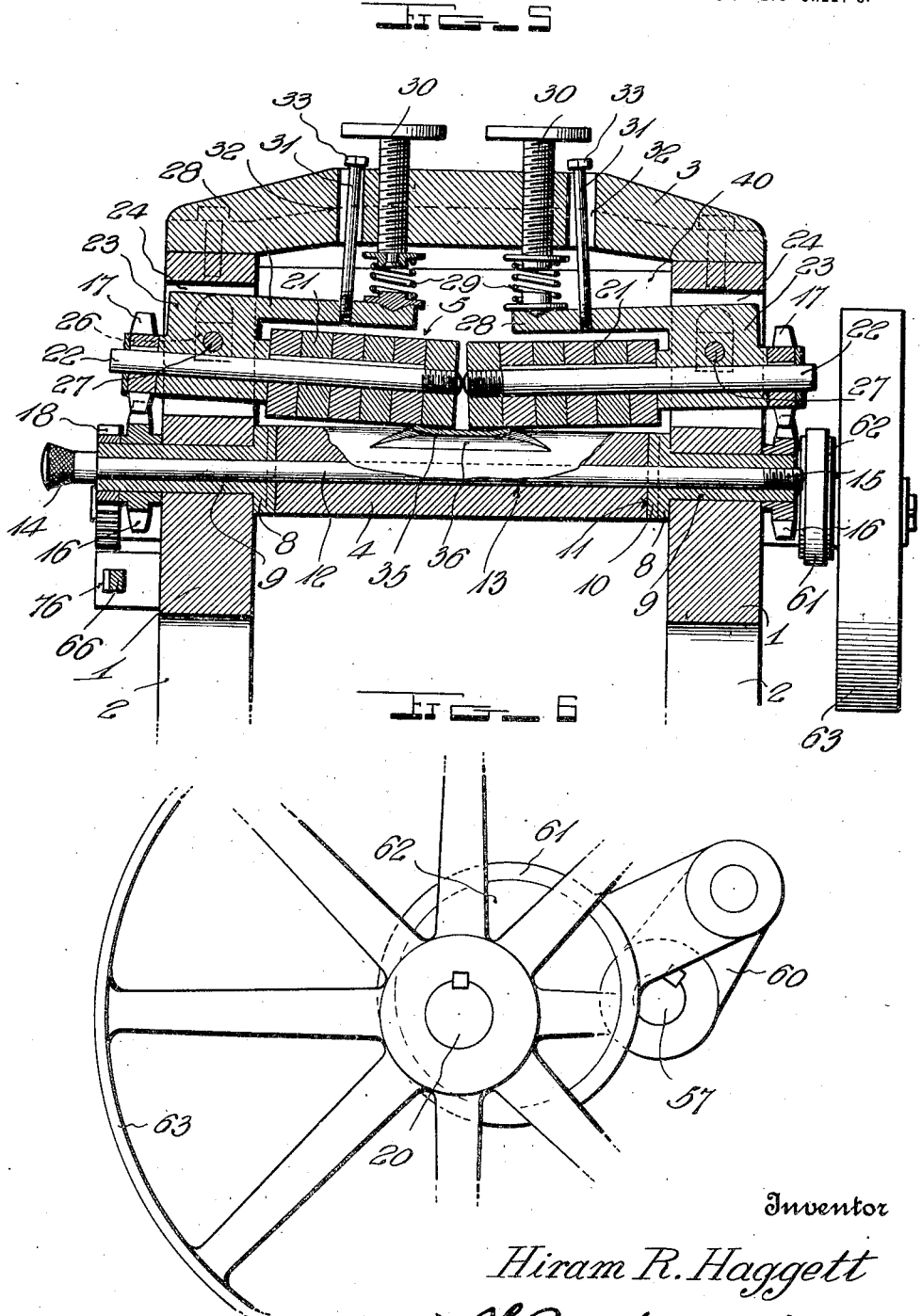

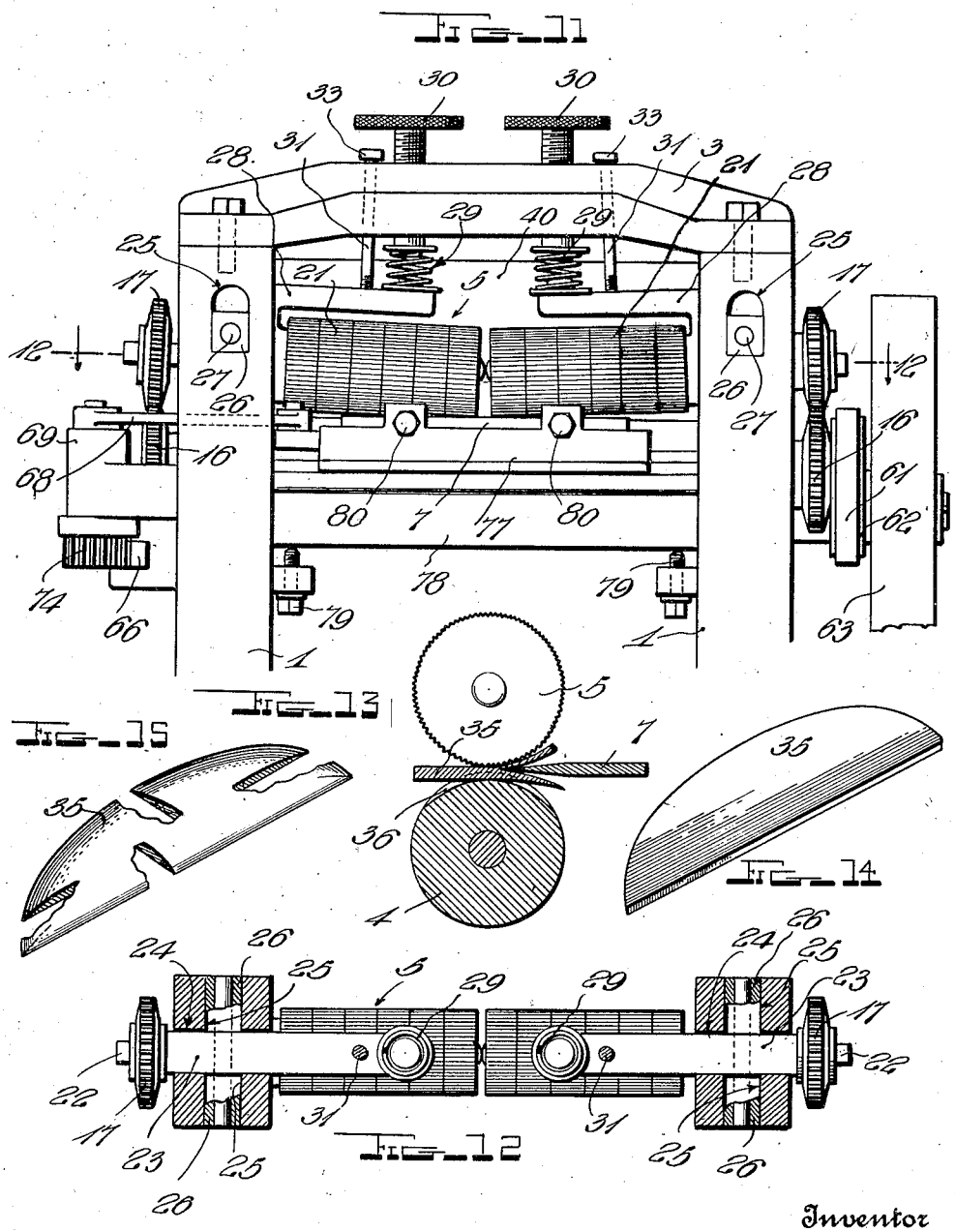

H. R. HAGGETT.
SKIVING MACHINE.
APPLICATION FILED JUNE 21, 1920.
1,430,077. Patented Sept. 26, 1922.
6 SHEETS—SHEET 6.
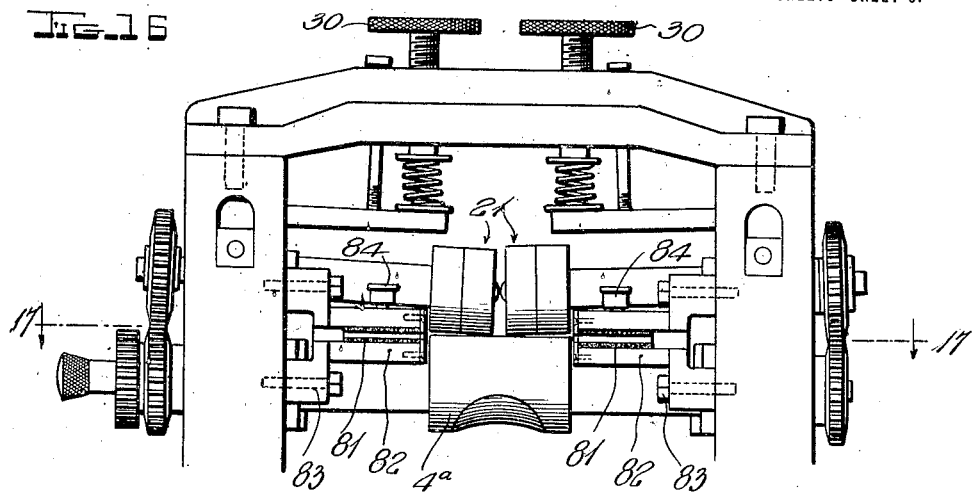
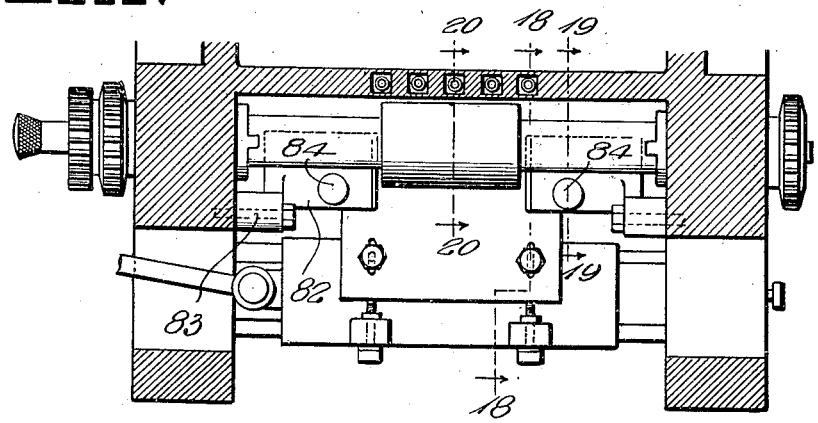
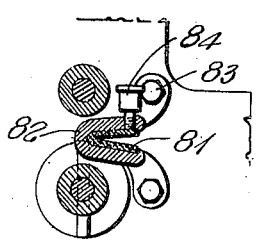
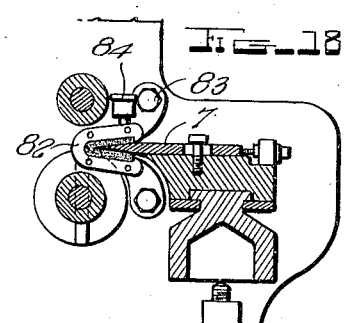
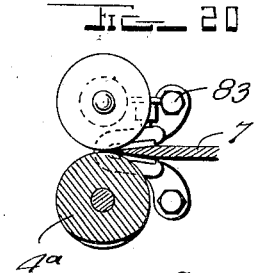
Inventor
Hiram R. Haggett
By H. B. Wilson & Co.
Attorneys Patented Sept. 26, 1922.

1,430,077

UNITED STATES PATENT OFFICE.

HIRAM R. HAGGETT, OF LYNN, MASSACHUSETTS.

SKIVING MACHINE.

Application filed June 21, 1920. Serial No. 390,477.

*To all whom it may concern:*

Be it known that I, HIRAM R. HAGGETT, a citizen of the United States, residing at Lynn, in the county of Essex and State of Massachusetts, have invented certain new and useful Improvements in Skiving Machines; and I do declare the following to be a full, clear, and exact description of the invention, such as will enable others skilled in the art to which it appertains to make and use the same.

My invention relates to skiving machines for use in the manufacture of heel counters and toe boxes.

One object of the invention is to provide for sliding the skiving knife in one direction across one blank as it is fed thereto and for sliding said knife in the opposite direction while cutting the next blank, this operation being repeated successively during the operation of the machine, in synchronism with a proceeding and receding feeder which feeds the blanks to said knife, between feed and cavity rolls.

Another object is to eliminate the usual spring fingers which are used for forcing the blanks into the cavity of the cavity roll, and to provide a feed roll transversely divided into relatively movable sections which are spring pressed toward the cavity roll, said sections serving not only to force the blanks against the skiving knife, but acting to depress such blanks into the cavity.

A still further object is to mount the cavity roll in such a manner as to permit quick detachment thereof and substitution of a different roll.

Other objects are to provide a novel arrangement of shoes beneath which the blanks are fed to the feed and cavity rolls; to make novel provision for wiping the knife and keeping its cutting edge free from foreign matter; and to devise a simple and efficient operating means for the blank feeder, capable of being thrown out of play whenever desired.

With the foregoing in view, the invention resides in the novel construction, combination and arrangement of parts hereinafter described and claimed, the descriptive matter being supplemented by the accompanying drawings.

Figure 1 is a side elevation of a skiving machine constructed in accordance with my invention.

Fig. 2 is a vertical section cut between the two side members of the frame.

Fig. 3 is a top plan view.

Figs. 4 and 5 are vertical sections as indicated by the lines 4—4 and 5—5 of Fig. 3.

Fig. 6 is a detail elevation of certain parts of the driving mechanism to be described.

Fig. 7 is a horizontal section as indicated by line 7—7 of Fig. 2.

Fig. 8 is a detail vertical section, partly in elevation, as viewed substantially on line 8—8 of Fig. 1.

Fig. 9 is a view similar to Fig. 8 but showing other parts in section.

Fig. 10 is a horizontal sectional view on the plane indicated by line 10—10 of Fig. 9.

Fig. 11 is an elevation of the machine in a direction at right angles to Fig. 1.

Fig. 12 is a horizontal section substantially on line 12—12 of Fig. 11.

Fig. 13 is a diagram of the skiving operation.

Figs. 14 and 15 are perspective views showing the blank before and after the knife has operated thereon.

Fig. 16 is a view somewhat similar to Fig. 11 showing the machine transformed for cutting toe boxes, the skiving knife being omitted from this view to more clearly show the knife wipers.

Fig. 17 is a horizontal section taken approximately on the line 17—17 of Fig. 16.

Figs. 18, 19 and 20 are detail vertical sections as indicated by the lines 18—18, 19—19 and 20—20 of Fig. 17 respectively.

In the drawings above briefly described, the numerals 1 designate two similar side members of a frame structure, said side members being provided with suitable legs 2 and being tied together at their upper ends by a crown bar 3. A cavity roll 4 extends between the side members 1, a transversely divided feed roll 5 is positioned slightly above said cavity roll, a proceeding and receding blank feeder 6 is positioned at one side of said rolls, a reciprocating skiving knife 7 is located at the other side thereof, and suitable operating connections are provided for the several parts.

The cavity roll 4 is preferably mounted in the manner shown most clearly in Fig. 5. The ends of this roll abut driving heads 8 on the inner ends of alined tubular shafts 9 which are journaled in the side members 1, co-acting driving means, such as the ribs 10 and grooves 11, being provided between said heads and said roll. A rod 12 passes through the two shafts 9 and through a central bore 13 in the roll 4 to normally hold this roll against lateral movement. When the rod is withdrawn, however, the roll 4 may be quickly detached and another substituted. One end of rod 12 is preferably provided with a knurled head 14 while its opposite end is threaded at 15 into one of the shafts 9.

Suitably secured on the projecting outer ends of the shaft 9, are star or other appropriate gears 16 which mesh with similar gears 17 for driving the feed roll 5, and one of said shafts 9 is provided with an additional gear 18 meshing with a driving pinion 19 on a main drive shaft 20 from which all parts of the machine are operated.

The feed roll 5 is transversely split into two relatively movable sections 21 and these sections are mounted to move either bodily or pivotally toward and away from the cavity roll 4, the teeth of the gears 16 and 17 being sufficiently long to permit such movement without interrupting the drive.

In the preferred form of the machine, the shafts 22 of the roll sections 21 are rotatably mounted in heads or bearings 23 which are received in openings 24 formed in the upper ends of the side members 1. The opening 24 are provided with parallel vertical sides having opposed slots 25 in which suitably shaped shoes 26 are slidable vertically, and the bearings 23 are provided with oppositely extending trunnions 27 which are rotatable within openings in said shoes. The bearings 23 are provided with inwardly extending rigid arms 28 upon which coil springs 29 exert a downward thrust, screws 30 being mounted in the crown bar 3 for adjusting the tension of said springs. These springs tend to force the sections 21 of the feed roll 5, downwardly toward the cavity roll 4 and at the same time they permit pivotal movement of said roll sections upon the trunnions 27, as well as allowing said sections to move bodily toward and from the feed roll. During the last mentioned movement of the roll sections 21, the shoes 26 slide in the slots 25.

Maximum downward movement of the arms 28 and consequently the roll sections 21, may be controlled by any suitable means, but I prefer to provide screws 31 for this purpose, said screws being loosely received in openings 32 in the crown bar 3 and having their lower ends threaded into the arms 28. The heads 33 of the screws 31 are adapted to strike the crown bar 3 and thus limit depression of the roll sections 21.

By dividing the feed roll 5 transversely and mounting its two sections 21 in the manner disclosed or in any other equivalent manner, the blanks 35 are properly depressed into the cavity 36 of the roll 4, without the necessity of providing the usual spring fingers for this purpose. I prefer, however, to employ a plurality of friction shoes 37 beneath which the blanks 35 are fed by the feeder 6. These shoes are preferably provided with upstanding shanks 38 receivable in vertical sockets 39 which open through the lower edge of a vertical wall 40 connecting the side members 1, at the side of the roll 5 remote from the knife 7. Suitable springs 41 are located in the sockets 39 for depressing the shoes 37 to resist the movement of the blanks 35 to such an extent as to hold them in proper engagement with the feeder 6 as the latter moves on its active or proceeding strokes.

The blanks 35 are stacked upon a suitable bed plate 42 over which the feeder 6 operates and said blanks bear against the wall 40, a follower 43 having a weight 44, being employed to force said blanks downwardly. The weight 44 is carried by the upper end of a stem 45 which rises from the follower 43, said stem passing through an opening in a transverse bar 46 positioned between the members 1, and a pair of adjustable fingers 47 depend from the bar 46 for engaging the ends of the blanks 35 as shown most clearly in Fig. 4. The fingers 47 may be adjusted along the bar 46 according to the length of the blanks.

The feeder 6 is preferably in the form of a flat plate secured at 48 to a carrying block 49 which is mounted on a reciprocating carriage 50 suitably guided and supported by the plate 42. By means of a suitable screw 51, the carrying block 49 may be adjusted with respect to the carriage 50, according to the width of the blanks 35. The carriage 50 is provided with a driving member 52 preferably in the form of a transverse rod which is engaged by a hook 53 on an operating link 54, said link being pivoted at 55 to a crank arm 56 which rises from a shaft 57 parallel with the shaft 20 and oscillated from the latter. The link 54 normally rests on an eccentric 58 but when said eccentric is turned, for instance by a handle 59, the link 54 drops by gravity out of engagement with the driving member 52, thereby throwing the feeder 6 out of play.

Any preferred means may be employed for oscillating the shaft 57 from the main drive shaft 20. I prefer, however, to employ the construction shown most clearly in Figs. 3 and 6. A crank arm 60 is secured to the shaft 57 and is operatively connected with an eccentric strap 61 surrounding an eccentric 62 on the shaft 20. The shaft 20 is continuously driven by any suitable means such as a belt passing around a pulley 63, but the shaft 57 is merely oscillated, so that the feeder 6 is properly actuated to feed the blanks 35 beneath the shoes 37 and between the rolls 4 and 5.

In addition to the functions above assigned to the shaft 57, said shaft co-acts with other parts for operating the knife 7. To this end, I prefer to employ the construction shown most clearly in Figs. 1, 7, 8, 9 and 10. A crank arm 64 is carried by the end of shaft 57 opposite the arm 61, said arm 64 being forked to straddle a driving pin or the like 65 on a horizontal knife operating bar 66 which is shown mounted slidably in a guide 67 carried by one of the side members 1. The knife 7 is connected by a link or other preferred means 68 with a crank arm or other eccentric 69 and a one-way driving connection is employed between said eccentric and the bar 66. By this arrangement, movement of the bar 66 in one direction will swing the eccentric 69 throughout 180 degrees, while reverse movement of said bar will have no effect on said eccentric. In the preferred form of construction, the eccentric 69 is rigidly carried by the upper end of a shaft 70 which is rotatable in a suitable bearing 71 carried by the frame of the machine, the lower end of said shaft having ratchet teeth 72 with which a suitable number of dogs 73 co-act, said dogs being carried by the upper end of a pinion 74 which is rotatably carried by the lower end of shaft 70, through the instrumentality of a bolt or the like 75. The teeth of the pinion 74 mesh with teeth 76 on the bar 66.

By employing the construction above described, the necessary intermittent movement of the eccentric 69 is effected, whereby to move the skiving knife 7 in one direction across one blank 35 and in the opposite direction across the next blank.

The skiving knife 7 is provided with a suitable carriage 77 slidable along a track 78 which extends between the said side members 1. The track is vertically adjustable by means of screws or the like 79 to properly position the cutting edge of the knife 7, and by means of other screws 80, said knife may be adjusted toward and from the rolls 4 and 5. Set screws 80' are preferably employed to rigidly clamp the knife to the carriage after adjustment.

The construction so far described is intended principally for skiving heel counters, while Figs. 16 to 20 show the machine adapted for skiving toe boxes. When such boxes are to be skived, a much shorter cavity roll 4ª is employed and several of the individual wheels of which the roll sections 21 are formed, may be removed. Otherwise, the general construction and operation of the machine is the same, but since the composition materials of which toe boxes are formed, are prone to gum the cutting edge of the knife 7, I prefer to provide a pair of wipers 81 for said knife said wipers being in the form of channel shaped absorbent bodies receiving the cutting edge of the knife and carried by channel shaped holders 82 which are secured at 83 to the inner sides of the frame members 1. Suitable cups 84 or other preferred means are provided for feeding a suitable knife cleaning agent to the wipers 81.

The general operation of the machine is as follows:

The blanks 35 are stacked as shown in Fig. 2 and when the machine is set in operation, the feeder 6 forces said blanks one at a time beneath the shoes 37 into the cavity 36 of the roll 4. The sectional feed roll 5 acts not only to retain the blanks in the cavity 36 but to feed them against the edge of the skiving knife 7 as illustrated, for instance, in Figs. 2 and 13. This knife is now being shifted in one direction along the track 78, by means of the one-way driving connection between the eccentric 69 and the operating bar 66 and by the time the skiving operation is completed, the knife has come to a standstill and said one-way driving connection is idling. By the time the next blank is received in the cavity 36, however, the driving connection in question again comes into play and shifts the knife in the opposite direction. Fig. 14 shows the condition of the blank before passage thereof through the machine and Fig. 15 which is partly broken away and in section, illustrates the completely skived counter.

In skiving toe boxes, the general operation of a machine is the same as that above explained, but the wipers 81 are then preferably employed, whereas their use is not essential when operating upon leather or other material having no tendency to gum the edge of the knife.

Particular attention is directed to the means for operating the skiving knife 7 in synchronism with the movement of the feeder 6; to the transversely divided feed roll and the mounting means therefor; to the manner of mounting the cavity roll 4 or 4ª; to the location of the shoes 37 in the wall 40 against which the blanks 35 are stacked; to the operating means 54—53—52—58 for the feeder 6; and to the wipers 81. All of these features are of great advantage and may obviously be embodied in numerous forms, within the scope of the invention as claimed.

I claim:

1. A skiving machine comprising a proceeding and receding blank feeder, an elongated skiving knife transverse to the line of movement of said blank feeder and slidable endwise, and means for sliding said knife in one direction concurrently with one working stroke of said feeder, and for sliding said knife in the opposite direction on the next working stroke.

2. A skiving machine comprising a proceeding and receding blank feeder, an elongated skiving knife transverse to the line of movement of said feeder, an eccentric connected with said knife for sliding the same endwise, a knife-operating bar, a one-way driving connection between said bar and said eccentric, and means for reciprocating said bar on a line parallel to the line on which said feeder travels.

3. A skiving machine comprising a proceeding and receding blank feeder, an elongated skiving knife transverse to the line of movement of said feeder, an eccentric connected with said knife for sliding the same endwise, a knife-operating bar, means for reciprocating said bar on a line parallel to the line on which said feeder travels, a rotatably mounted shaft carrying the aforesaid eccentric, a pinion on said shaft, and a one-way driving connection between said pinion and shaft, said operating bar having teeth meshing with said pinion.

4. A skiving machine comprising a frame structure, a proceeding and receding blank feeder mounted on said frame structure, a rock shaft transverse to and connected with said feeder for operating the same, an elongated skiving knife mounted on said frame structure transverse to the line of movement of said feeder, an eccentric connected with said knife for sliding it endwise, a guide on said frame structure, a knife-operating bar slidable in said guide on a line parallel to the line on which said feeder travels, a one-way driving connection between one end of said bar and the aforesaid eccentric, and a crank arm on the aforesaid rock shaft connected with the other end of said bar for reciprocating the same.

5. A skiving machine comprising a cavity roll, and a combined pressure and feed roll, the latter being transversely divided into relatively movable sections, and yieldable mounting means for said sections actuating the latter to force blanks into the cavity of the cavity roll.

6. A skiving machine comprising a cavity roll, a feed roll operatively associated with said cavity roll and transversely divided into two relatively movable sections, and spring means acting on said sections to force them toward said cavity roll.

7. A skiving machine comprising a cavity roll, a feed roll operatively associated with said cavity roll and transversely divided into two relatively movable sections, means pivotally mounting the outer ends of said roll sections, and spring means acting on said sections to rock them around their pivots.

8. A skiving machine comprising a cavity roll, a feed roll operatively associated with said cavity roll and transversely divided into two relatively movable sections, means mounting the outer ends of said roll sections for pivotal movement toward and from the cavity roll and for movement bodily with respect to said roll, and spring means normally resisting both movements of said roll sections.

9. A skiving machine comprising a cavity roll, a frame carrying said roll and having portions rising above the ends thereof, a pair of bearings pivotally mounted on said frame portions, a feed roll transversely divided into two separate sections, said sections being carried respectively by said bearings, arms extending inwardly from said bearings, and spring means acting downwardly on said arms.

10. A skiving machine comprising a cavity roll, a frame carrying said roll and having portions rising above the ends thereof, shoes having limited vertical movement on said frame portions, bearings pivotally connected with said shoes, a feed roll transversely divided into two separate sections, said sections being carried respectively by said bearings, arms extending inwardly from said bearings, and spring means acting downwardly on said arms.

11. A skiving machine comprising a cavity roll, a frame carrying said roll and having portions rising above the ends thereof, said portions having openings provided with opposed vertical side walls having vertical slots, shoes slidable vertically in said slots, bearings in said openings pivoted to said shoes for vertical oscillation, horizontal shafts rotatable in said bearings and carrying two feed roll sections, gearing for driving the outer ends of said shafts from said cavity roll, arms extending inwardly from said bearings, and spring means acting downwardly on said arms.

12. The combination with a skiving machine having a reciprocating skiving knife, of a channel shaped absorbent wiper receiving the beveled edge of the knife, a similarly shaped holder for said wiper attached to the frame of the machine, and means carried by said holder for feeding a knife cleaning agent to said wiper.

13. A knife cleaning device for skiving machines comprising a channel shaped holder having laterally extending ears at one end for securing it to the frame of the machine, a channel shaped absorbent lining in said holder adapted to receive and contact with the beveled edge of the skiving knife, and a cup supported by said holder to contain a cleaning agent, said cup having a passage leading to said lining.

In testimony whereof I have hereunto set my hand.

HIRAM R. HAGGETT.